United States Patent
Funayama et al.

(10) Patent No.: US 7,126,795 B2
(45) Date of Patent: Oct. 24, 2006

(54) MAGNETIC RECORDING HEAD, A MAGNETIC REPRODUCING HEAD, A MAGNETIC RECORDING APPARATUS, AND A MAGNETIC REPRODUCING APPARATUS

(75) Inventors: Tomomi Funayama, Kanagawa-Ken (JP); Kohichi Tateyama, Kanagawa-Ken (JP); Michiko Hara, Kanagawa-Ken (JP); Masatoshi Yoshikawa, Kanagawa-Ken (JP); Hiroaki Yoda, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/938,611

(22) Filed: Aug. 27, 2001

(65) Prior Publication Data

US 2002/0024777 A1   Feb. 28, 2002

(30) Foreign Application Priority Data

Aug. 31, 2000   (JP)   ............ P2000-263840

(51) Int. Cl.
*G11B 5/127* (2006.01)
*G11B 5/33* (2006.01)

(52) U.S. Cl. .................................. 360/318.1
(58) Field of Classification Search ............ 360/318.1, 360/318, 322, 317, 319, 321
See application file for complete search history.

(56) References Cited

U.S. PATENT DOCUMENTS

| | | | |
|---|---|---|---|
| 4,734,644 A | 3/1988 | Imakoshi et al. | 324/252 |
| 5,274,521 A | 12/1993 | Miyauchi et al. | 360/119 |
| 5,486,967 A | 1/1996 | Tanaka et al. | 360/318 |
| 5,491,606 A | 2/1996 | Hesterman et al. | 360/318.1 |
| 5,995,339 A | 11/1999 | Koshikawa et al. | 360/321 |
| 6,064,552 A | 5/2000 | Iwasaki et al. | 360/322 |

(Continued)

FOREIGN PATENT DOCUMENTS

JP   4-103010   4/1992

(Continued)

OTHER PUBLICATIONS

Patent Abstracts of Japan, JP 63-091818, Apr. 22, 1988.

(Continued)

*Primary Examiner*—Tianjie Chen
(74) *Attorney, Agent, or Firm*—Oblon, Spivak, McClelland, Maier & Neustadt, P.C.

(57) ABSTRACT

A magnetic recording head, a magnetic reproducing head, a magnetic recording apparatus comprising the magnetic recording head, and a magnetic reproducing apparatus comprising the magnetic reproducing head are described. The magnetic reproducing head having a magnetic gap at a medium-facing surface and includes a pair of magnetic yokes of ferromagnetic material, a magnetoresistance effect film, and a pair of biasing films. One of the pair of magnetic yokes has a magnetic tip at the medium-facing surface and also a rear portion recessed from the medium-facing surface and magnetically coupled to the magnetic tip. The magnetic tip has a first width in a track width direction at the medium-facing surface, and the rear portion has a second width in the track width direction wider than the first width. The magnetoresistance effect film is recessed from the medium-facing surface and is magnetically coupled to the pair of magnetic yokes of ferromagnetic material. The pair of biasing films are recessed from the medium-facing surface and one of the pair of biasing films comprises a hard magnetic material layer disposed adjacent to the rear portion or an antiferromagnetic material layer disposed in contact with the rear portion. The magnetic tip may be provided with appropriate volume of the magnetic biasing from the magnetic biasing film and magnetic domains in the magnetic tip may be sufficiently controlled.

19 Claims, 10 Drawing Sheets

U.S. PATENT DOCUMENTS

| | | |
|---|---|---|
| 6,307,708 B1 | 10/2001 | Yoda et al. |
| 6,437,949 B1 * | 8/2002 | Macken et al. ............. 360/319 |
| 6,490,139 B1 * | 12/2002 | Hayashi et al. ............. 360/322 |
| 6,577,475 B1 * | 6/2003 | Sasaki et al. ............... 360/317 |
| 2001/0026423 A1 * | 10/2001 | Arai et al. .................. 360/321 |
| 2002/0036873 A1 * | 3/2002 | Hara et al. .................. 360/321 |
| 2002/0039264 A1 * | 4/2002 | Ohsawa et al. ............. 360/322 |

FOREIGN PATENT DOCUMENTS

| | | |
|---|---|---|
| JP | 4-167211 | 6/1992 |
| JP | 6-131635 | 5/1994 |
| JP | 6-251335 | 9/1994 |
| JP | 6-325331 | 11/1994 |
| JP | 11-266044 | 9/1999 |
| JP | 11-329836 | 11/1999 |

OTHER PUBLICATIONS

Patent Abstracts of Japan, JP 62-102411, May 12, 1987.

Y. Yoshida, et al., IEEE Transactions on Magnetics, vol. 34, No. 4, XP-000833154, pp. 1507-1509, "Planar, Contact, Yoke GMR Head VS. Conventional, Flying, Shielded GMR Head: A Comparative Study", Jul. 1998.

Notice of Reason for Rejection (JP-A-2000-263840) issued by Japanese Patent Office on May 31, 2004 with translation.

* cited by examiner

MAGNETIC RECORDING HEAD, A MAGNETIC REPRODUCING HEAD, A MAGNETIC RECORDING APPARATUS, AND A MAGNETIC REPRODUCING APPARATUS

CROSS-REFERENCE TO RELATED APPLICATION

This application claims the benefit of priority from the prior Japanese Patent Application No. P2000-263840, filed on Aug. 31, 2000; the entire contents of which are incorporated herein by reference.

BACKGROUND OF THE INVENTION

1. Field of the Invention

The present invention relates to magnetic recording and reproducing heads, and magnetic recording and reproducing apparatuses, and more particularly to the magnetic recording head comprising a magnetic core, the magnetic reproducing head comprising a magnetic yoke, a magnetic recording apparatus having the magnetic recording head, and a magnetic reproducing apparatus having the magnetic reproducing head.

2. Discussion of the Background

In a magnetic recording and reproducing apparatus, a magnetic recording medium stores magnetic information as a magnetization direction of magnetic recording bits on the magnetic recording medium. Therefore, each magnetic recording bit of the magnetic recording medium must stably keep magnetization information, and a large magnetization bit is preferable for the stable maintenance of the magnetic information. However, a narrower track width and a shorter bit length in a track length direction of each magnetic recording bit are required for high-density magnetic recording and reproducing technology. Such a small recording bit of the magnetic recording medium tends to have a large demagnetizing field, the recorded magnetization of each recording bit tends to be unstable, and the reproduced signal output tends to decrease.

For reproducing magnetic information recorded on the magnetic recording media, several MagnetoResistance effect (MR) heads have been proposed. The Spin Valve Giant MagnetoResistance effect (SV-GMR) head is one of the MR head and utilizes a mechanism in which the resistance between magnetically uncoupled ferromagnetic layers is observed to vary as the cosine of the angle between the magnetization of the two layers and is independent of the direction of current flow. The SV-GMR head can obtain a higher signal output in reproducing than Anisotropic MagnetoResistance effect (AMR) heads. The SV-GMR is described in U.S. Pat. No. 5,206,590.

Another MR head using a different mechanism termed Tunnel MagnetoResistance effect (TMR) is also reported. The mechanism is obtained by a structure including a ferromagnetic layer, a dielectric tunnel barrier layer, and a ferromagnetic layer and is expected to realize higher reproducing signal output than the SV-GMR head.

Each MR head has a magnetic gap at a surface facing the magnetic recording medium and a shorter magnetic gap length in a track length direction is required to obtain the small magnetic recording bit. However each head has the MR element in the magnetic gap at the medium-facing surface, and that gap must have a marginal minimum length. For example, the SV-GMR and TMR heads need a minimum magnetic gap length of about 100 nanometers. Each MR head having the MR element at the medium-facing surface is called a shield MR head.

A lower flying height between the magnetic head and the magnetic recording medium is also required for high-density magnetic recording and reproducing, and the lower flying height increases frequency of collision between the magnetic head and the magnetic recording medium. The increased number of collisions produces an irregular magnetoresistance, such as Thermal Asperity (TA) noise, of the MR element disposed at the medium-facing surface.

Each of the shield magnetic recording and reproducing heads has the above described marginal minimum gap length as well as the TA noise, and in view of this, a magnetic head using a pair of magnetic yokes has been developed for the shorter magnetic gap length and the reduced TA noise. The pair of magnetic yokes in the magnetic head extends from a medium-facing surface to a region recessed from the medium-facing surface and transfers signal magnetic field from the medium-facing surface to the recessed region where the pair of magnetic yokes are magnetically coupled to a MR element disposed on the recessed region.

The magnetic reproducing head using the pair of magnetic yokes has an advantage that the MR element can be disposed on rear surfaces of the pair of magnetic yokes so the entire body of the MR element is disposed near the medium-facing surface. The rear surfaces of the pair of magnetic yokes are parallel to the medium-facing surface. The magnetic reproducing head having the MR element disposed on the rear surfaces of the pair of magnetic yokes is the so-called horizontal or planar magnetic reproducing head. The planar magnetic head has the pair of magnetic yokes and the MR element. Each of the pair of magnetic yokes extends from the medium-facing surface to the rear surface, which is parallel to the medium-facing surface. The planar magnetic reproducing head is described in U.S. Pat. No. 5,274,521.

The planar magnetic reproducing head is generally manufactured through forming the pair of magnetic yokes on a substrate, forming the MR element on top surfaces of the pair of magnetic yokes, and removing and separating the substrate from the magnetic yoke and the MR element. Surfaces of the pair of magnetic yokes facing the substrate are the medium-facing surfaces, and the top surfaces of the pair of magnetic yokes are the rear surfaces.

The planar magnetic reproducing head tends to have reproducing noise caused by magnetic domain wall generated in the pair of magnetic yokes, and also tends to produce an unexpected magnetic field to the magnetic recording medium caused by residual magnetization in the pair of magnetic yokes. Such reproducing noise is suppressed by a magnetic domain control by providing a bias magnetic field to the pair of magnetic yokes and a conductor layer for producing a magnetic action of a current to the magnetic yoke to suppress the magnetic domain wall in the pair of magnetic yoke. Such magnetic domain control is disclosed in U.S. Pat. No. 5,274,521. In the planar magnetic reproducing head, respective tips of the pair of magnetic yokes for high recording and reproducing density must be as small as about 1 square micrometer or less, and domain control of the small magnetic yoke tips tends to be incomplete.

SUMMARY OF THE INVENTION

An object of the present invention is to resolve the above problem of conventional technology and provide a magnetic head comprising magnetic domain controlled yokes or cores and a magnetic information recording and/or reproducing apparatus having the magnetic head.

In a first aspect, one embodiment of the present invention provides a magnetic reproducing head having a magnetic gap at a medium-facing surface. The magnetic reproducing head comprises a pair of magnetic yokes of ferromagnetic material, a magnetoresistance effect film, and a pair of biasing films. One of the pair of magnetic yokes has a magnetic tip at the medium-facing surface and a rear portion recessed from the medium-facing surface and magnetically coupled to the magnetic tip. The magnetic tip has a first width in a track width direction at the medium-facing surface, and the rear portion has a second width in the track width direction. The second width is wider than the first width. The magnetoresistance effect film is recessed from the medium-facing surface, and magnetically coupled to the pair of magnetic yokes of ferromagnetic material. One of the pair of biasing films comprises a hard magnetic material layer disposed adjacent to the rear portion or an antiferromagnetic material layer disposed in contact with the rear portion.

In a second aspect, one embodiment of the present invention provides a magnetic recording head having a magnetic gap at a medium-facing surface. The magnetic recording head has a pair of magnetic cores of ferromagnetic material, and one of the pair of magnetic cores has a magnetic tip at the medium-facing surface and a rear portion is recessed from the medium-facing surface and also magnetically coupled to the magnetic tip. The magnetic tip has a first width in a track width direction at the medium-facing surface, and the rear portion has a second width in the track width direction. The second width is wider than the first width. The magnetic recording head has a recording coil, which provides a magnetic recording field due to current flow in the recording coil and is recessed from the medium-facing surface. The magnetic recording head has a pair of biasing films that is recessed from the medium-facing surface, and one of the pair of biasing films comprises a hard magnetic material layer adjacent to the rear portion or an antiferromagnetic material layer in contact with the rear portion.

The magnetic reproducing and recording heads according to the first and second aspects of the present invention may be loaded on a magnetic reproducing head, for example a hard disk drive (HDD).

According to the first and second aspects of the embodiments of the present invention, the magnetic tip may be provided with appropriate volume of the magnetic biasing from the magnetic biasing film and magnetic domain in the magnetic tip may be sufficiently controlled. The magnetic biasing film is arranged near the rear portion according to the first and second aspects of the embodiment of the present invention, the magnetic biasing may be arranged with less marginal are (free from marginal are).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In various aspects, the present invention relates to a magnetic recording head, a magnetic reproducing head, a magnetic recording apparatus comprising the magnetic recording head, and a magnetic reproducing apparatus comprising the magnetic reproducing head. The magnetic recording head comprises a pair of magnetic cores with a pair of biasing films disposed adjacent to their respective magnetic cores. The magnetic reproducing head comprises a MR element and a pair of magnetic yokes with a pair of biasing films disposed adjacent to their respective magnetic yokes.

One of the pair of magnetic yokes of the magnetic reproducing head may have at least two portions. One portion of the magnetic yoke may be a magnetic yoke tip disposed on a medium-facing surface of the magnetic reproducing head, and another portion of magnetic yoke may be a rear portion recessed from the medium-facing surface and magnetically coupled with the magnetic yoke tip. The rear portion of magnetic yoke may have a width wider than that of the magnetic yoke tip and may be provided with a magnetic biasing film disposed adjacent to the rear portion.

One of the pair of magnetic cores of the magnetic recording head may have at least two portions. One portion of the magnetic core may be a magnetic core tip disposed on a medium-facing surface of the magnetic recording head, and another portion of the magnetic core may be a rear portion recessed from the medium-facing surface and magnetically coupled with the magnetic core tip. The rear portion of magnetic core may have a width wider than that of the magnetic core tip and may be provided with a magnetic biasing film disposed adjacent to the rear portion.

First Embodiment

Figure 1:
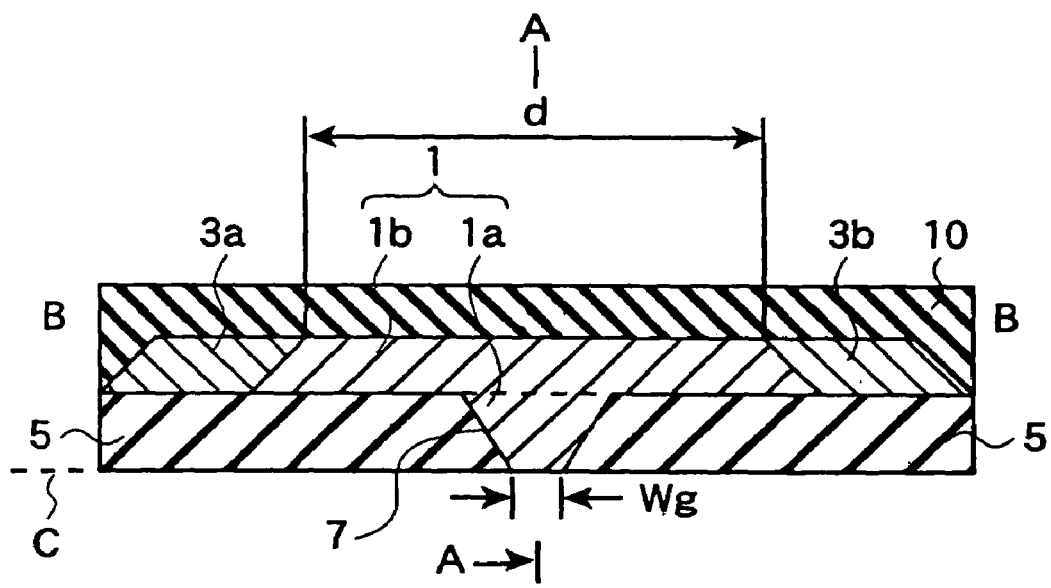
FIG. 1 is a cross-sectional view showing a magnetic reproducing head according to a first embodiment of the present invention.
Figure 2:
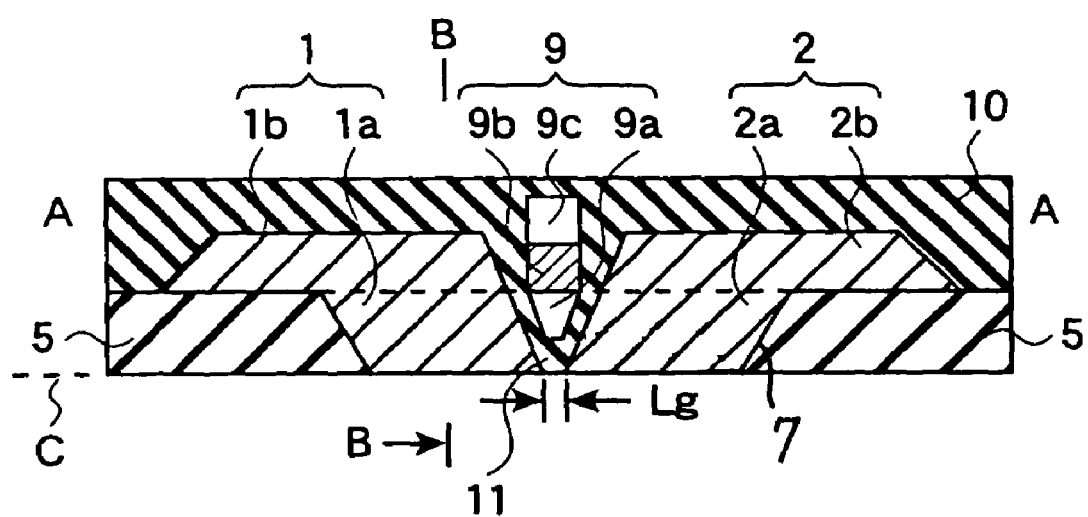
FIG. 2 is a cross-sectional view along line A—A of the magnetic reproducing head shown in FIG. 1, in accordance with the first embodiment of the present invention.

FIG. 1 is a schematic cross-sectional view in a track width direction of a magnetic reproducing head according to a first embodiment of the present invention. FIG. 2 is a schematic cross-sectional view in a track length direction that is substantially perpendicular to the track width direction shown in FIG. 1. The cross-sectional view of FIG. 1 is along the line B—B shown in FIG. 2, and the cross-sectional view of FIG. 2 is along the line A—A shown in FIG. 1.

The structure presented in FIG. 1 comprises a magnetic yoke 1, a pair of biasing films 3a and 3b, insulator films 5 and 10, and a trench 7. The magnetic yoke 1 shown in FIG. 1 has a first magnetic yoke tip 1a at a medium-facing surface C and a first rear portion 1b recessed from the medium-facing surface C. The first magnetic yoke tip 1a shown in FIG. 1 has a track width Wg substantially parallel to a track width direction of a magnetic recording medium.

The structure presented in FIG. 2 comprises a pair of magnetic yokes including the magnetic yoke 1 and another magnetic yoke 2, a MR element 9, the insulator films 5 and 10, the trench 7, and a magnetic gap 11. The magnetic gap 11 disposed between the pair of magnetic yokes 1 and 2 at the medium-facing surface C shown in FIG. 2 has a magnetic gap length Lg substantially parallel to a track length direction of the magnetic recording medium.

The MR element 9 shown in FIG. 2 has a lower electrode 9a, a MR film 9b disposed on the lower electrode 9a, and the upper electrode 9c disposed on the MR film 9b. The MR film 9b is electrically coupled to the lower and upper electrodes 9a and 9c.

The second magnetic yoke 2 shown in FIG. 2 comprises a second magnetic yoke tip 2a disposed at the medium-facing surface C and a second rear portion 2b recessed from the medium-facing surface C and magnetically coupled to the second magnetic yoke tip 2a.

The broken lines in FIGS. 1 and 2 show respective boundaries between the first magnetic yoke tip 1a and the first rear portion of magnetic yoke 1b, and between the second magnetic yoke tip 2a and the second rear portion of magnetic yoke 2b.

A signal magnetic field is picked up at the medium-facing surface C by the first and second magnetic yoke tips 1a and 2a and then may be transferred to the first and second rear portions of magnetic yokes 1b and 2b and provided to the MR film 9b.

The first and second magnetic yoke tips 1a and 2a shown in FIG. 2 are disposed at the medium-facing surface C with the magnetic gap 11 disposed between the pair of magnetic yoke tips 1a and 2a. If the magnetic head of the embodiments of the present invention fly over the recording medium during its operation, the medium-facing surface C remains a certain distance from the magnetic recording medium via air and the medium-facing surface may be called an Air Bearing Surface (ABS). If the magnetic head of the embodiments of the present invention contacts the magnetic recording medium in operation, the medium-facing surface C keeps in contact with the magnetic recording medium surface during it's operation. The medium-facing surface C of both the flying or contacting magnetic heads may be covered with a protection film. The protection film protects the pair of magnetic yoke tips from deterioration caused by collisions or contacts with the magnetic recording medium.

The first magnetic yoke tip 1a shown in FIG. 1 has a track width Wg and the first rear portion of magnetic yoke 1b may have a width in the track width direction wider that the track width Wg. If the magnetic yoke 1 shown in FIG. 1 consists of the first magnetic yoke tip 1a and the first rear portion of magnetic yoke 1b, the magnetic yoke 1 may have a cross-sectional structure, which is parallel to the track width direction and substantially T shaped.

The second magnetic yoke tip 2a shown in FIG. 2 may has a track width substantially the same as the track width Wg, and the second rear portion of magnetic yoke 2b may have a width in the track width direction wider than the track width of the second magnetic yoke tip 2a. If the magnetic yoke 2 shown in FIG. 2 consists of the first magnetic yoke tip 2a and the first rear portion of magnetic yoke 2b, the magnetic yoke 2 may have a cross-sectional structure, which is parallel to the track width direction and substantially T-shaped.

Each of the pair of magnetic yokes 1 and 2 comprises a ferromagnetic material film, a laminated film of ferromagnetic material layers, or a laminated film comprising a ferromagnetic material layer and a nonmagnetic material layer.

The ferromagnetic material of the ferromagnetic material film or the ferromagnetic material layer may be a crystal ferromagnetic material (for example, NiFe, FeTaN, FeCo) or other known crystal ferromagnetic material. The ferromagnetic material of the ferromagnetic material film or the ferromagnetic material layer may also be an amorphous ferromagnetic material (for example CoZrNb) or granular ferromagnetic material (for example CoFe—$Al_2O_3$). The granular ferromagnetic material may have grains of ferromagnetic material (for example CoFe), and nonmagnetic material (for example $Al_2O_3$) surrounding the grains of ferromagnetic material. Fine crystal ferromagnetic material (for example FeTaN) and the granular ferromagnetic material may be appropriate because of their high saturation magnetic flux density and fine soft magnetic characteristic. The granular ferromagnetic material may be appropriate for the first and second magnetic yoke tips 1a and 2a when the magnetic head contacts the magnetic recording medium during operation.

The nonmagnetic material of the nonmagnetic layer of the laminated film may be a nonmagnetic material or alloy well known in the art.

If the magnetic reproducing head is composite and formed with a magnetic recording head on a slider, the ferromagnetic materials of the magnetic yokes of the magnetic reproducing head and magnetic cores of the magnetic recording head may be distinct and each of the ferromagnetic materials may be chosen to be appropriate for respective head characteristics. The ferromagnetic materials of the magnetic yokes and the magnetic cores of the composite magnetic recording and reproducing head may also be the same, and the magnetic yokes and magnetic cores may be formed in the same steps so the manufacturing cost may be reduced.

The magnetic gap 11 shown in FIG. 2 comprises a nonmagnetic material, for example, a nonmagnetic insulator material (for example $SiO_2$ or $Al_2O_3$) or a nonmagnetic conductive material (for example Si).

The pair of magnetic biasing films 3a and 3b shown in FIG. 1 are abutted to and disposed on respective slanted side surfaces of the first and second rear portions of magnetic yokes 1b and 2b, so that the magnetic domain in the first and second rear portions of magnetic yokes 1b and 2b are controlled to be reduced.

For a magnetic recording and reproducing apparatus of high recording density, for example, a recording density of 100 gigabit per square inch (Gbpsi) or more, the track width Wg may range from 0.1 micrometers to 0.2 micrometers and the track length Lg may be 50 nanometers or less. The distance from the medium-facing surface C to the MR film 9b of the magnetic reproducing head shown in FIG. 2 or a magnetic recording coil of the magnetic recording head may also become thinner for maintaining certain magnetic flux efficiency and may be 0.1 micrometers or less.

The magnetic domain control of the first magnetic yoke tip 1a is necessary, and the arrangements of the magnetic biasing films 3a and 3b, the first magnetic yoke tip 1a and the first rear portion of the magnetic yoke 1b according to the present embodiment enables the magnetic biasing films 3a and 3b to provide an appropriate and controlled bias magnetic field to the first magnetic yoke tip 1a. The magnetic biasing film 3b is also arranged near the first rear portion 1b and is free from the difficulties for its arrangement. If the magnetic biasing film 3a is disposed near the first magnetic yoke tip 1a, the magnetic biasing of the magnetic biasing film 3a to the first magnetic yoke tip 1a may be too strong, and it may be difficult to provide the magnetic biasing film 3a near the medium-facing surface C because of the marginal area at the medium-facing surface C.

The magnetic domain control of the second magnetic yoke tip 2a may also be necessary, and the magnetic biasing film 3a and 3b may also be disposed adjacent to or in contact with the second rear portion 2b according to the present embodiment so that the magnetic biasing films 3a may provide an appropriate and controlled bias magnetic field to the second magnetic yoke tips 2a.

Each of the magnetic biasing films 3a and 3b may comprise a hard magnetic material layer, (for example, CoPt layer) or an antiferromagnetic material layer. The hard magnetic material layer may provide a magnetic field to the first and second rear portions of magnetic yokes 1b and 2b as the magnetic biasing. The antiferromagnetic material layer may be disposed in contact with the first and second rear portions of magnetic yokes 1b and 2b and exchange coupled with the rear portions of magnetic yokes 1b and 2b so that the rear portions of magnetic yokes 1b and 2b are provide with an exchange coupling field as the magnetic biasing. The antiferromagnetic material of the antiferromagnetic material layer may be PtMn, IrMn, NiMn, FeMn, NiO, or other materials known in the art.

The hard magnetic layer of the pair of magnetic field providing films 3a and 3b may provide magnetic field (bias magnetic filed) to the adjacent first and second rear portions of magnetic yokes 1b and 2b and enables smooth movement or transfer of the signal magnetization in the magnetic yokes 1 and 2. The exchange coupled ferromagnetic material layer of the first and second rear portions of magnetic yoke 1b and 2b also provides a bias magnetic field to its adjacent portions of magnetic yokes 1 and 2 so that the smooth movement or transfer of the signal magnetization in the magnetic yokes 1 and 2 may also be obtained.

The volume strength of the biasing field may be adjusted by varying respective film thickness of the pair of magnetic biasing films 3a and 3b and distances d between the pair of magnetic biasing films 3a and 3b shown in FIG. 1.

The magnetic biasing films 3a and 3b may provide the bias magnetic field in a direction parallel to the track width direction to the magnetic yokes 1 and 2 so that the direction of the bias magnetic field may be perpendicular to the recording magnetic field transfer in the magnetic yokes 1 and 2 and possible magnetic field caused by residual magnetization in the magnetic yokes 1 and 2 may be almost perpendicular to the reproducing magnetic field and may not effect the magnetization recorded on the magnetic recording medium.

The bias magnetic field in the direction parallel to the track width direction may also be preferred because an initial magnetization of the magnetic yokes 1 and 2 may be directed perpendicular to the reproducing magnetic flux flow in the magnetic yokes 1 and 2. The magnetic reproducing signal may transfer in the magnetic yokes 1 and 2 at magnetization rotational mode so domain walls transfer of possible part magnetic domain walls may not provide serious noise.

An additional portion of the magnetic yoke 1 may be applicable and may be disposed between the first magnetic yoke tip 1a and the first rear portion of magnetic yoke 1b or on top of the first rear portion of magnetic yoke 1b. Another additional portion of the magnetic yoke 2 may also be applicable and may be disposed between the second magnetic yoke tip 2a and the second rear portion of magnetic yoke 2b or on top of the second rear portion of magnetic yoke 2b.

Each of the first and second magnetic yoke tips 1a and 2a may be formed in a different body from a corresponding rear portion of magnetic yokes 1b and 2b and separated at the boundary shown by broken lines in FIGS. 1 and 2. However, each of the first and second magnetic yoke tips 1a and 2a is magnetically coupled with the corresponding rear portion of magnetic yokes 1b and 2b. Each of the first and second magnetic yoke tips 1a and 2a may also be formed in the same body with a respective one of the rear portions of magnetic yokes 1b and 2b so discontinuous bias magnetic field by discontinuous magnetization transfer at the boundary may be suppressed.

The MR element 9 shown in FIG. 2 is recessed from the medium-facing surface C, and it may be disposed between the pair of magnetic yokes 1 and 2 or may be disposed over the first and second magnetic rear portions 1b and 2b and the magnetic gap 11. The MR element 9 is magnetically coupled to the magnetic yokes 1 and 2 to receive the signal magnetic field from the magnetic yokes 1 and 2. The electrical resistance of the MR film 9b changes due to an applied signal magnetic field provided by the pair of magnetic yokes 1 and 2.

The MR element 9 comprises the MR film 9b and the pair of electrodes 9a and 9c coupled to the MR film 9b. The electrical resistance of the MR film 9b changes in accordance with the applied signal magnetic field. Examples of such films include the AMR film, the SV-GMR film, TMR-film, or other MR films known in the art. The SV-GMR film is described in U.S. Pat. No. 5,206,590, and entire contents of this U.S. patent are incorporated herein by reference.

The SV-GMR film 9b shown in FIG. 2 is coupled to the lower and upper electrodes 9a and 9c through its lower and upper surface so that the sense current flows perpendicular to the film plane of the SV-GMR film 9b, and such structure may be defined as Current Perpendicular to the Plane (CPP) SV-GMR.

The SV-GMR film of the embodiments of the present invention may comprise a first ferromagnetic material layer, a second ferromagnetic material layer, and a nonmagnetic material layer disposed between the first and second ferromagnetic material layers. There may be an under layer(s) between the lower electrode 9a and the first ferromagnetic material layer and a capping layer(s) between the second ferromagnetic material layer and the upper electrode 9c. Other additional layers known in the art may be applicable to the SV-GMR.

In the CPP-SV-GMR, those layers may be formed on the lower electrode 9a such as the first ferromagnetic material layer may be formed on the lower electrode 9a, the nonmagnetic material layer may be formed on the first ferromagnetic material layer, and the second ferromagnetic material layer may be formed on the nonmagnetic material layer and may contact the upper electrode 9c. The pair of electrodes 9a and 9c are coupled to the SV-GMR films and provide a sense current perpendicular to the film surface of the MR film 9b so that the current flows across the first and second ferromagnetic material layers and the nonmagnetic material layer.

The insulator film 3 shown in FIGS. 1 and 2 surrounds side surfaces of the pair of magnetic yoke tips 1a and 2a, and the insulator film 10 shown in FIGS. 1 and 2 covers the magnetic yokes 1 and 2 and the MR element 9.

Figure 3:
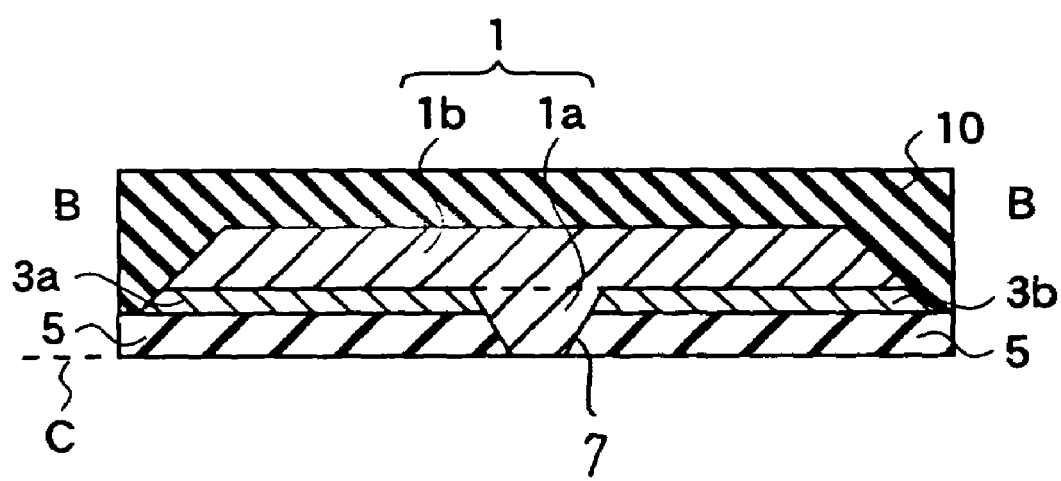
FIG. 3 is a cross-sectional view showing a magnetic head according to a modified embodiment of the present invention.
Figure 4:
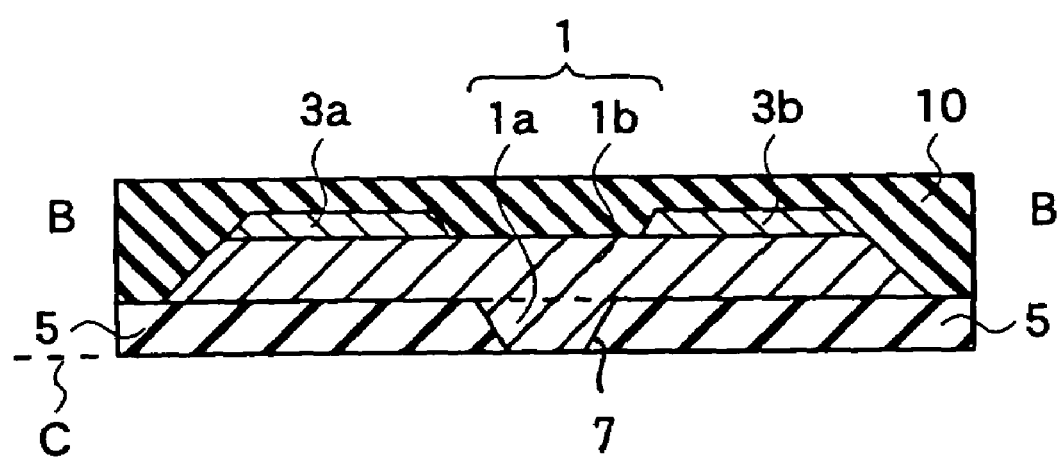
FIG. 4 is a cross-sectional view showing a magnetic head according to a second modified embodiment of the present invention.
Figure 5:
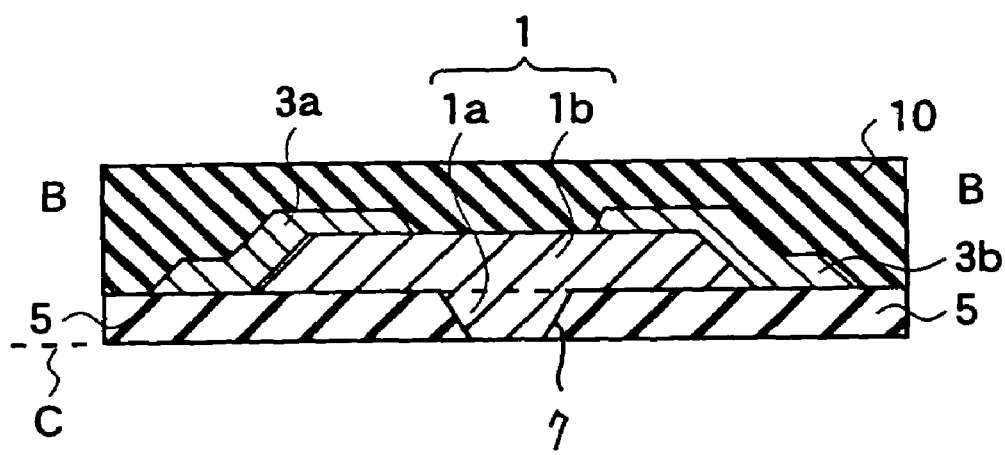
FIG. 5 is a cross-sectional view showing a magnetic head according to a third modified embodiment of the present invention.

There may be various arrangements of the pair of magnetic biasing films 3a and 3b, and some of them are shown in FIGS. 3, 4, and 5. FIGS. 3, 4, and 5 respectively show cross-sectional views of magnetic recording or reproducing heads in parallel to the track width direction.

The magnetic biasing film 3a shown in FIG. 3 is disposed under the first rear portion of magnetic yoke 1b and in contact with the lower surface (medium-facing surface side) of the first rear portion of magnetic yoke 1b. Another magnetic biasing film 3b may also be arranged in symmetrical arrangement with the magnetic biasing film 3a shown in FIG. 3 and disposed in contact with the lower surface of the second rear portion of magnetic yoke 2b.

The magnetic biasing film 3a shown in FIG. 4 is disposed over the entire surface or parts of the upper surface of the rear portion of magnetic yokes 1b. Another magnetic biasing film 3b may also be arranged in symmetrical arrangement with the magnetic biasing film 3a shown in FIG. 4 and disposed in contact with the upper surface of the second rear portion of magnetic yoke 2b.

The magnetic biasing film 3a shown in FIG. 5 is disposed over parts of the upper surfaces and side surfaces of the first rear portion of magnetic yoke 1b. The magnetic biasing film 3a may be disposed over the entire upper surface of the first rear portion of magnetic yoke 1b. Another magnetic biasing film 3b may also be arranged in symmetrical arrangement with the magnetic biasing film 3a shown in FIG. 5 and disposed in contact with the upper and side surfaces of the second rear portion of magnetic yoke 2b.

Those arrangements of the pair of magnetic biasing films 3a and 3b may be chosen by magnetic characteristic of its material and/or film thickness of the pair of magnetic biasing films 3a and 3b.

Each of the magnetic biasing films 3a and 3b shown in FIGS. 1 and 5 may preferably comprise a hard magnetic material layer. Each of the magnetic biasing films 3a and 3b shown in FIGS. 3 and 4 may preferably comprise the antiferromagnetic material layers in contact with the corresponding first and second rear portions of magnetic yoke 1b and 2b or each of the magnetic biasing films 3a and 3b shown in FIGS. 3 and 4 may preferably comprise the exchange coupling film having an antiferromagnetic material layer and an ferromagnetic material layer in contact with the antiferromagnetic material layer.

In the various arrangements, a direction of the magnetic biasing parallel to the direction of the magnetic track width Wg may enable initial magnetization of the pair of magnetic yokes 1 and 2 to be substantially perpendicular to recording and/or reproducing magnetization so movement of transfer of the magnetization at magnetization rotation mode may be attained and noise due to movement of magnetic walls in the pair of magnetic yokes 1 and 2 may be suppressed despite the presence of the possible partial magnetic walls in the pair of magnetic yokes 1 and 2. Direction of each magnetic biasing applied in a direction parallel to the magnetic track width Wg enables that a possible magnetic field due to residual magnetization of the pair of magnetic yoke tips 1a and 2a may be perpendicular to the direction of the recording magnetic field and doesn't effect the recorded magnetization on the magnetic recording medium.

The appropriate volume of bias magnetic field may be applied to the pair of magnetic yokes 1 and 2 so the magnetic reproducing head according to the present embodiment and its variations described above may have less possibility of Barkhausen noise while keeping a high reproducing efficiency.

Second Embodiment

Figure 6:
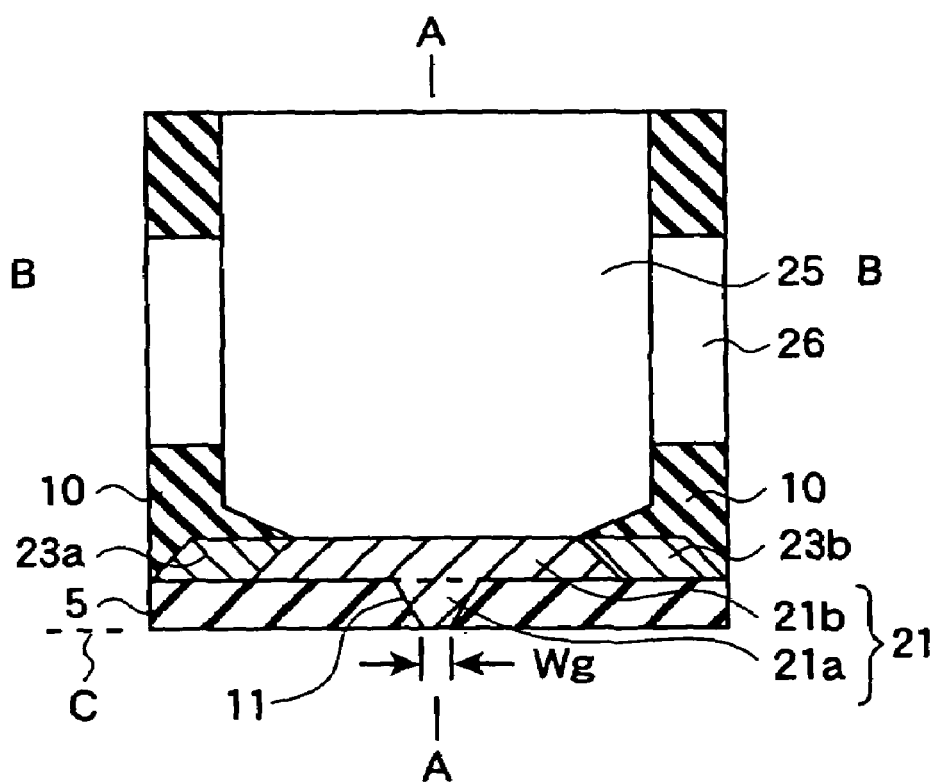
FIG. 6 is a cross-sectional view showing a magnetic recording head according to a second embodiment of the present invention.
Figure 7:
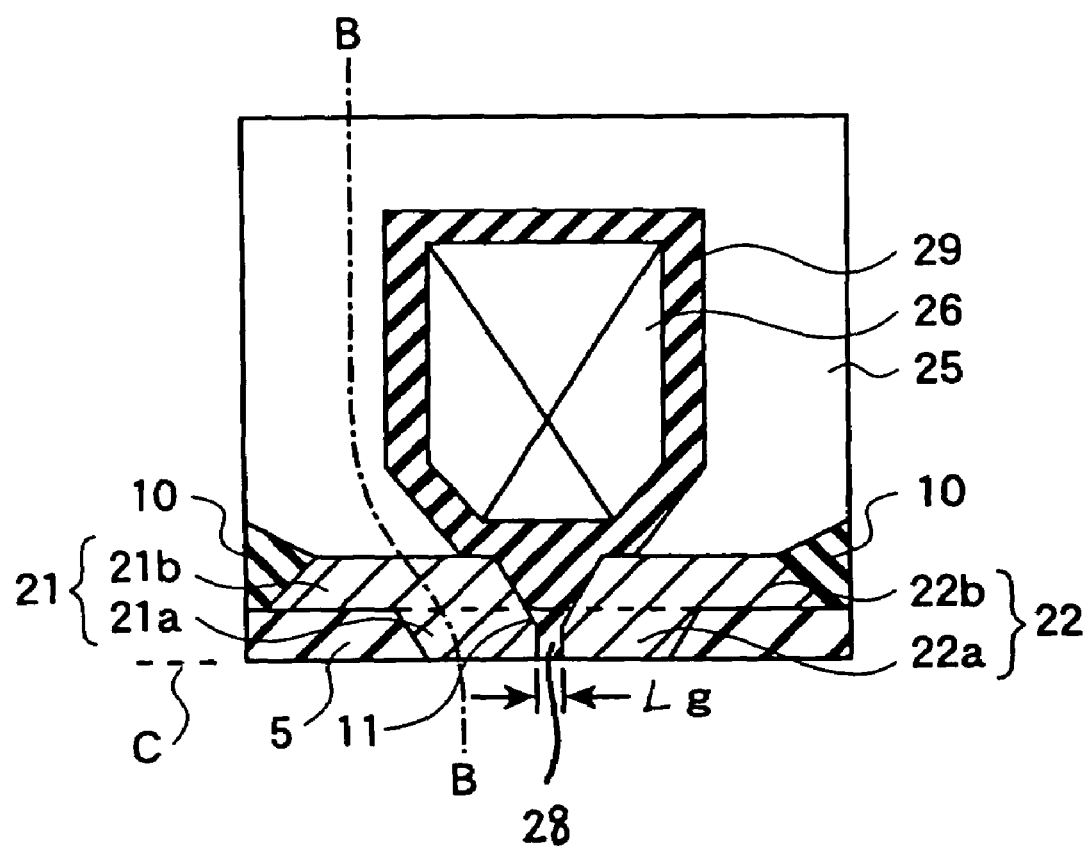
FIG. 7 is a cross-sectional view along line A—A of the magnetic recording head shown in FIG. 6, in accordance with the second embodiment of the present invention.

FIG. 6 is a schematic cross-sectional view of a magnetic recording head in a track width direction according to a second embodiment of the present invention. FIG. 7 is a schematic cross-sectional view in a track length direction that is substantially perpendicular to the track width direction shown in FIG. 6. The cross-sectional view of FIG. 7 is along the line A—A shown in FIG. 6 and the cross-sectional view of FIG. 6 is along the line B—B shown in FIG. 7.

The structure of the composition presented in FIG. 6 comprises a first main core 21, a pair of magnetic biasing films 23a and 23b, insulator films 5 and 10, a trench 11, an auxiliary magnetic core 25, and a recording coil 26.

The structure of the composition presented in FIG. 7 comprises the first main core 21 and a second main core 22, a magnetic gap 28, the insulator films 6 and 10, the auxiliary magnetic core 25, and the recording coil 26 electrically insulated from the auxiliary magnetic core 25 by an insulator film 29, which is interposed between the recording coil 26 and the auxiliary magnetic core 25.

The first main core 21 shown in FIGS. 6 and 7 comprises a first magnetic core tip 21a disposed at a medium-facing surface C and a first rear portion of magnetic core 21b in contact with the first magnetic core tip 21a at a boundary. The second main magnetic core 22 shown in FIG. 7 also comprises a second magnetic core tip 22a disposed at the medium-facing surface C and a second rear portion of magnetic core 22b in contact with the magnetic core tip 22b at a boundary. The broken lines in FIGS. 6 and 7 show the respective boundaries between the first magnetic core tip 21a and the first rear portion of magnetic core 21b, and the second magnetic yoke tip 22a and the second rear portion of magnetic core 22b.

The first and second magnetic core tips 21a and 22a may be formed as one body with the corresponding one of the rear portions of magnetic core 21b and 22b so smooth movement of magnetization of the magnetic cores 21 may be obtained. Alternatively, the first and second magnetic core tips 21a and 22a may be formed as separate bodies with the corresponding one of the rear portions of magnetic core 21b and 22b.

The first magnetic core tip 21a shown in FIG. 6 has a track width Wg at the medium-facing surface C. The second magnetic core tip 22a may also have a track width, which is substantially equal to the track width of the first magnetic core tip 21a at the medium-facing surface.

The first rear portion of magnetic core 21b shown in FIG. 6 may have a width in the track width direction, and the width of the first rear portion may be wider than the width of the first magnetic core tip 21a. Therefore the first main core 21 may have a T-shaped cross-sectional structure in the track width direction as shown in FIG. 6. The second rear portion of magnetic core 22b may also have a width in the track width direction, and the width of the second rear portion may be wider than the width of the second magnetic core tip 22a. The first rear portion 21a shown in FIG. 6 has slanted side surfaces at edge regions in the track width direction, and the second rear portion 22b may also have slanted side surfaces at edge regions in the track width direction. The side surfaces of the first and second rear portions 21a and 22a may not be slanted, and the lower surfaces of the first and second rear portions 21a and 22a may be vertical.

The first and second magnetic cores 21 and 22 may comprise a ferromagnetic material layer and the ferromagnetic material of the ferromagnetic material layer described in the first embodiment may also be used for the ferromagnetic material layer of the first and second magnetic cores 21 and 22 in this embodiment.

The appropriate volume of biasing magnetic field as described in the first embodiment may be applied to the pair of magnetic core tips 21a and 22a from the respective magnetic biasing films 23a and 23b so the magnetic recording head according to the second embodiment of the present invention may attain fine magnetic domain control in the first and second main cores 21 and 22.

The auxiliary magnetic core 25 shown in FIGS. 6 and 7 may be disposed in contact with top surfaces of the first and second main cores 21 and 22 or disposed adjacent to the top surfaces of the pair of main cores 21 and 22, so the auxiliary magnetic core 25 and the first and second main cores 21 and 22 are magnetically coupled. The auxiliary magnetic core 25 is provided with a magnetically induced current, which flows through the magnetic coil 26 and the auxiliary magnetic core 25 and transfers the signal magnetic field from the magnetic coil 26 to the first and second main cores 21 and 22. The coil shown in FIGS. 6 and 7 has a portion extending in a track width direction and a pair of end portions extending in a track length direction so that the coil has a half-turn shape or a C shape in a cross-section in parallel to the medium-facing surface C. The coil is provided with a straight-line current so the auxiliary magnetic core 25 is provided with a signal magnetic field that winds around the straight-line current. Other known arrangements or structures of the auxiliary magnetic core 25 and the coil 26 for providing the signal magnetic field to the first and second main cores 21 and 22 may be employed.

Top surfaces of the first and second rear portions of magnetic cores 21b and 22b shown in FIGS. 6 and 7 are broader than the surfaces of the first and second magnetic core tips 21a and 22b at the medium-facing surface C so sufficient contact area between the pair of magnetic cores 21 and 22 and the auxiliary magnetic core 25 may be ensured, and the magnetic recording head according to the present embodiment of the present invention may attain high magnetic recording efficiency.

Direction of the magnetic biasing field applied to the first and second main cores 21a and 22a may be parallel to the track width direction so the initial magnetization may be substantially perpendicular to the direction of the recording magnetic flux flow in the first and second main cores 21a and 22a, and the transfer of the reproducing magnetic signal in the first and second magnetic cores 21a and 22a may be in magnetization rotational mode. Therefore, if there are possible and part magnetic domain walls in the first and second magnetic cores 21 and 22, noise caused by magnetic domain wall transfer in the magnetic yokes 21 and 22 may not be serious problem.

Third Embodiment

FIGS. 8A, 8B, 8C, 8D and 8G are schematic cross-sectional views in track length directions of some manufacturing steps of a magnetic reproducing head according to a third embodiment of the present invention. FIGS. 8E and 8F are schematic cross-sectional views in a track width direction of some steps of manufacturing the magnetic reproducing head according to the third embodiment of the present invention.

Figure 8:
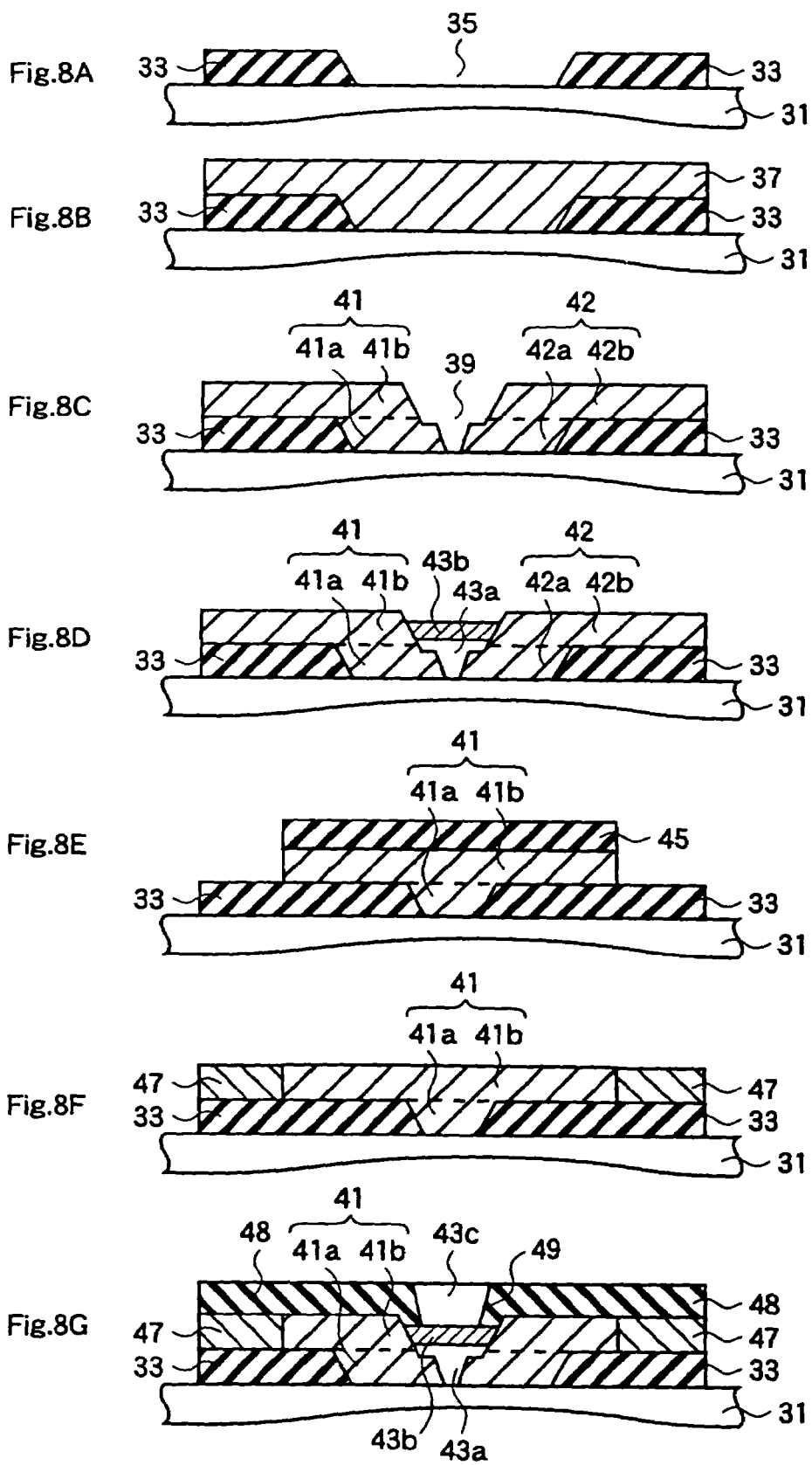
FIGS. 8A, 8B, 8C, 8D, 8E, 8F, and 8G are cross-sectional views showing a method for manufacturing a magnetic reproducing head according to a third embodiment of the present invention.

Insulator film 33 shown in FIG. 8A is formed on a surface of a substrate 31 and has a region defining a trench 35 in the center of the insulator 33. The trench 35 may extend from a surface of the insulator films 33 to the surface of the substrate 31. Side surfaces of the trench 35 shown in FIG. 8A may be slightly tapered, but may not be tapered and may be vertical to the surface of the substrate 31.

The insulator film 33 having the trench 35 may be formed by deposition of an insulator material followed by removal of the center portion corresponding to the trench 35 through a dry etching process. The insulator material of the insulator film 33 may comprise a nonmagnetic insulator material, for example $SiO_2$.

A ferromagnetic material film 37 shown in FIG. 8B is formed in the trench 35 and on top surfaces of the insulator film 33. The top surfaces of the ferromagnetic material film shown in FIG. 8B may be chemically and mechanically polished so the top surfaces of the ferromagnetic material film 37 shown in FIG. 8B may have a plane surface, and the ferromagnetic material film 37 may have a thick center region over the trench 35 and thin outer regions over the insulator film 33. The ferromagnetic material of the ferromagnetic material film 37 may contain a ferromagnetic material described above in the previous embodiments.

A region defining a second trench 39 shown in FIG. 8C is formed in a center region of the ferromagnetic material film 37 by etching the center region of the ferromagnetic material film 37. The trench 39 shown in FIG. 8C extends from the ferromagnetic material film 37 to the surface of the substrate 31 so the ferromagnetic material film 37 is separated into a pair of magnetic yokes 41 and 42 shown in FIG. 8C.

The magnetic yoke 41 has a first magnetic yoke tip 41a near the surface of the substrate 31 and a first rear portion of magnetic yoke 41b, which is recessed from the surface of the substrate 31. The first rear portion of magnetic yoke 41b is disposed on the first magnetic yoke tip 41a and the insulator film 33 that the first rear portion of magnetic yoke 41b is magnetically coupled to the first magnetic yoke tip 41a and extends in a track width direction.

Another magnetic yoke 42 also has a second magnetic yoke tip 42a near the surface of the substrate 31 and a second rear portion of magnetic yoke 42b. The second rear portion of magnetic yoke 42b is recessed from the surface of the substrate 31 and disposed on the second magnetic yoke tip 42a and the insulator film 33. The second rear portion of magnetic yoke 42b is thus magnetically coupled to the second magnetic yoke tip 42a and extends in a track width direction.

Each of the rear portions of magnetic yokes 41b and 42b is portion above the corresponding broken line shown in FIGS. 8D, 8E, 8F, and 8G.

A lower electrode 43a and a MR film 43b shown in FIG. 8D are formed in the second trench 35a by deposition or sputtering of conductive material(s) of the lower electrode 43a and the MR film 43. The lower electrode 43a and the MR film 43b may be electrically separated from the pair of magnetic yokes 41 and 42 by an insulator film (not shown). A resist pattern 45 shown in FIG. 8E may be formed on the pair of magnetic yokes 41 and 42. The resist pattern 45 also covers the MR film 43b.

The magnetic yoke 41 shown in FIG. 8E may be patterned through dry etching using the resist pattern 45 as a mask so that parts of the insulator film 33 are exposed. A magnetic biasing material layer may be formed on the exposed parts of the insulator film 33 and the resist pattern 45. Then the resist pattern 45 and a portion of the magnetic biasing material layer on the resist pattern 45 may be patterned so the magnetic biasing film 47 shown in FIG. 8F may remain on the exposed surface of the insulator film 33 and surrounds the first rear portion of magnetic yoke 41b through side surfaces of the first rear portion of magnetic yoke 41b. Another magnetic yoke 42 may also be patterned through a similar dry etching process using the resist pattern 45 as a mask, and the magnetic biasing film 47 may surround the pair of magnetic yokes 41 and 42 through their outer side surfaces.

An insulator film 48 shown in FIG. 8G may be formed on the magnetic yokes 41 and 42 and the pair of magnetic biasing film 47. A portion defining a contact hole for an upper electrode coupled to the MR film 43b and extending to an upper surface of the MR film 35b may A be electrically coupled to the MR film 43b.

According to this embodiment, each of the magnetic yoke tips 41a and 42a is formed as one body with a corresponding one of the rear portions of magnetic yokes 41b and 42b without any gap, so the bias magnetic field may be applied to the magnetic yoke tips 41a and 42a without any loss of magnetic signal.

While the magnetic head described in this embodiment is the magnetic reproducing head, the method of manufacturing the pair of magnetic yokes and the biasing film 47 described in this embodiment may also be applied to a pair of magnetic cores of a magnetic recording head.

Fourth Embodiment

Figure 9:
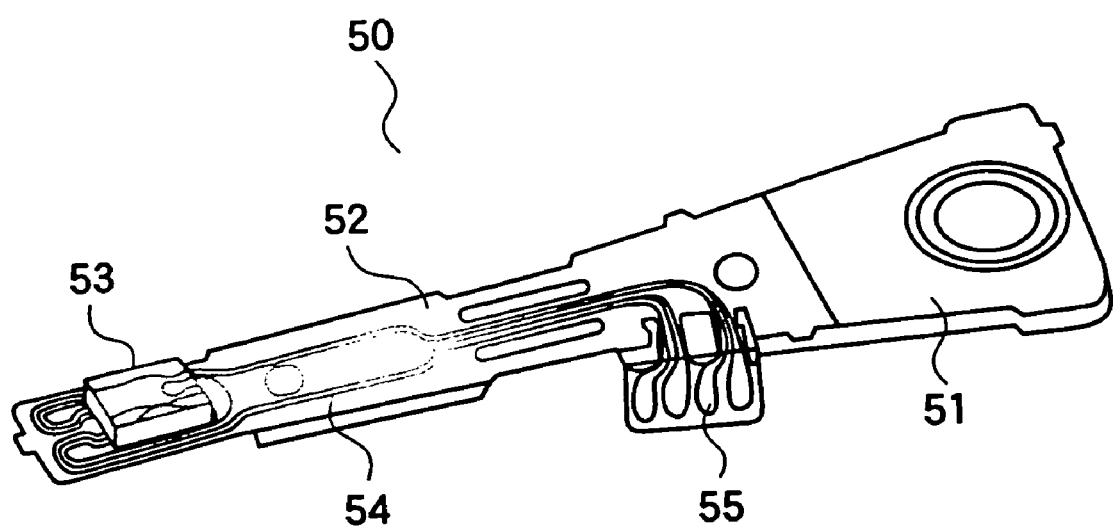
FIG. 9 is a bird's eye view showing a head gimbal assembly according to a fourth embodiment of the present invention.
Figure 10:
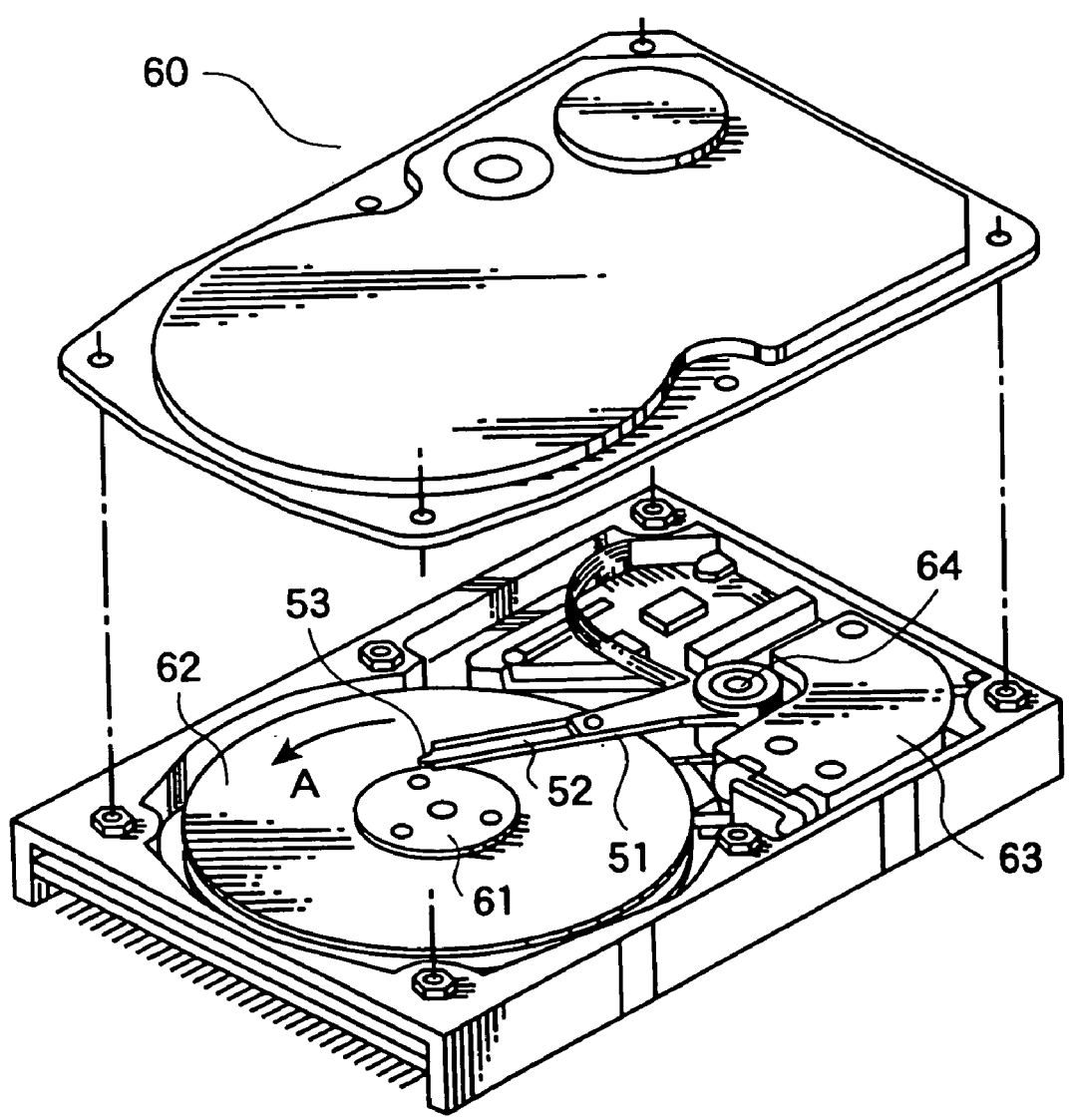
FIG. 10 is a bird's eye view showing a hard disk drive loaded with the head gimbals assembly shown in FIG. 9 according to the fourth embodiment of the present invention.

FIGS. 9 and 10 are schematic birds-eye's views of a head gimbals assembly and of a hard disk drive according to a fourth embodiment of the present invention.

The head gimbal assembly 50 shown in FIG. 9 has a surface facing a magnetic recording medium when the head gimbal assembly 50 is loaded in the hard disk drive 60 shown in FIG. 10.

The head gimbal assembly 50 shown in FIG. 9 has an actuator arm 51 and a suspension 52 connected to the actuator arm 51 at one end. The actuator arm 51 may comprise a bobbin holding (not shown) and a drive coils (not shown).

A head slider 53 comprising one of the magnetic recording and reproducing heads described above or a composite magnetic head may be attached to another end of the suspension 52. The composite magnetic head may comprise one of the magnetic reproducing and recording heads descried in embodiments of the present invention.

The suspension 52 in FIG. 9 may be formed with lead wires 54 on its surface. The lead wires 54 shown in FIG. 9 may be connected to electrodes of the magnetic heads 53 at one end and may also be connected to the electrode pads 55 on the suspension 52 at another end so the lead wires 54 connects the electrodes of the magnetic heads 53 and the electrodes pads 55 and transmits electric signals of the magnetic recording and/or reproducing.

The hard disk drive 60 shown in FIG. 10 may be loaded with a rotary actuator and a spindle 61. The spindle 61 may rotate in a direction shown as arrow A in FIG. 10 by a motor (not shown), which receives control signals from driving controller unit (not shown). The head slider 53 shown in FIG. 10 may be attached to a tip of the thin suspension 52 and the magnetic recording medium 62 may rotate at a predetermined speed so the head slider 53 may fly over the surface of the magnetic recording medium 52 while keeping a certain distance between the surfaces of the magnetic recording medium 62 and the medium-facing surface C of the head slider 53.

The actuator arm 51 shown in FIG. 10 may be connected to a linear motor, for example a coil motor 63. The coil motor 63 shown in FIG. 10 may comprise a magnetic circuit having a drive coil, a pair of permanent magnets sandwiching the drive coil, and yokes. The drive coil may be wound up around the bobbin.

The actuator arm 51 may be held by boll bearings set up at upper and lower sides of a fixed shaft 64, so the actuator arm 51 may be turn round over the magnetic recording medium 62. The magnetic recording medium 62 may not be limited to hard disk medium but also other magnetic recording medium such as a flexible disk medium and a magnetic card. The magnetic recording medium may also be removable medium.

Wherein the present invention has been particularly shown and described with reference to preferred embodiments thereof, it will be understood by those skilled in the art that various other changes in the form and details may be made therein without departing from the spirit and scope of the invention.

What is claimed is:

1. A magnetic reproducing head having a magnetic gap at a medium-facing surface, comprising:
   a pair of magnetic yokes of ferromagnetic material having the magnetic gap formed between the pair of magnetic yokes, one of the pair of magnetic yokes having a magnetic tip at the medium-facing surface and a rear portion recessed from the medium-facing surface and magnetically coupled to the magnetic tip, the magnetic tip having a first width in a track width direction at the medium-facing surface, the rear portion having a second width in the track width direction, and the second width being wider than the first width;
   a magnetoresistance effect film recessed from the medium-facing surface, disposed between the pair of magnetic yokes and magnetically coupled to the pair of magnetic yokes of ferromagnetic material, the rear portion of the one of the pair of magnetic yokes and the magnetoresistance effect film being aligned in a track length direction;
   a pair of biasing films recessed from the medium-facing surface, one of the pair of biasing films comprising a hard magnetic material layer disposed adjacent to the rear portion or an antiferromagnetic material layer disposed in contact with the rear portion, the rear portion of the one of the pair of magnetic yokes and the pair of biasing films being aligned in the track width direction;
   an insulation layer disposed between each of the pair of magnetic yokes and the magnetoresistance effect film and also between each of the pair of biasing films and the magnetoresistance effect film.

2. The magnetic reproducing head of claim 1, wherein each of the pair of magnetic yokes of ferromagnetic material comprises a front surface parallel to the medium-facing surface and a rear surface parallel to the medium-facing and front surfaces, and wherein the magnetoresistance effect film has a film surface parallel to the rear surfaces.

3. The magnetic reproducing head of claim 2, wherein the magnetoresistance effect film is disposed between the pair of magnetic yokes of ferromagnetic material and recessed from the medium-facing surface.

4. The magnetic reproducing head of claim 1, wherein the magnetic tip and rear portion comprise a continuously formed ferromagnetic material body.

5. The magnetic reproducing head of claim 1, wherein the magnetic tip is discrete from the rear portion.

6. The magnetic reproducing head of claim 1, further comprising a pair of electrodes, one of the pair of electrodes being coupled to a lower film surface of the magnetoresistance effect element and another one of the pair of electrodes being coupled to an upper film surface of the magnetoresistance effect element.

7. The magnetic reproducing head of claim 1, wherein the one of the pair of magnetic biasing films comprises the hard magnetic material layer and the hard magnetic material layer is disposed in contact with a side surface of the rear portion of the magnetic yoke.

8. The magnetic reproducing head of claim 7, wherein the side surface of the rear portion is tapered.

9. The magnetic reproducing head of claim 1, wherein each of the pair of magnetic biasing films comprises the antiferromagnetic material layer and the antiferromagnetic material layer is disposed in contact with a lower or an upper surface of the rear portion, the lower surface being a side of the medium-facing surface and the upper surface being remote from the medium-facing surface.

10. A magnetic reproducing apparatus for reproducing magnetic information recorded on a magnetic medium, comprising:
   a magnetic reproducing head having a magnetic gap at a medium-facing surface, comprising:
   a pair of magnetic yokes of ferromagnetic material having the magnetic gap formed between the pair of magnetic yokes, one of the pair of magnetic yokes having a magnetic tip at the medium-facing surface and a rear portion recessed from the medium-facing surface and magnetically coupled to the magnetic tip, the magnetic tip having a first width in a track width direction at the medium-facing surface, the rear portion having a second width in the track width direction, and the second width being wider than the first width,
   a magnetoresistance effect film recessed from the medium-facing surface, disposed between the pair of magnetic yokes and magnetically coupled to the pair of magnetic yokes of ferromagnetic material, the rear portion of the one of the pair of magnetic yokes and the magnetoresistance effect film being aligned in a track length direction,
   a pair of biasing films recessed from the medium-facing surface, one of the pair of biasing films comprising a hard magnetic material layer disposed adjacent to the rear portion or an antiferromagnetic material layer disposed in contact with the rear portion, the rear portion of the one of the pair of magnetic yokes and the pair of biasing films being aligned in the track width direction;
   an insulation layer disposed between each of the pair of magnetic yokes and the magnetoresistance effect film and also between each of the pair of biasing films and the magnetoresistance effect film.

11. A magnetic reproducing head having a magnetic gap at a medium-facing surface, comprising:
   a pair of magnetic yokes of ferromagnetic material, each of the pair of magnetic yokes having a magnetic tip at the medium-facing surface and a rear portion recessed from the medium-facing surface and magnetically coupled to the magnetic tip, at least one magnetic tip of the pair of magnetic yokes having a first width in a track width direction at the medium-facing surface, at least one rear portion of the pair of magnetic yokes having a second width in the track width direction, and the second width being wider than the first width;
   a magnetoresistance effect film recessed from the medium-facing surface, disposed between the pair of magnetic yokes and magnetically coupled to the pair of magnetic yokes of ferromagnetic material, the rear portion of one of the pair of magnetic yokes and the magnetoresistance effect film being aligned in a track length direction;
   a pair of biasing films recessed from the medium-facing surface, one of the pair of biasing films comprising a hard magnetic material layer disposed adjacent to the rear portion or an antiferromagnetic material layer disposed in contact with the rear portion, the rear portion of the one of the pair of magnetic yokes and the pair of biasing films being aligned in the track width direction;
   an insulation layer disposed between each of the pair of magnetic yokes and the magnetoresistance effect film and also between each of the pair of biasing films and the magnetoresistance effect film.

12. The magnetic reproducing head of claim 11, wherein each of the pair of magnetic yokes of ferromagnetic material comprises a front surface parallel to the medium-facing surface and a rear surface parallel to the medium-facing and front surfaces, and wherein the magnetoresistance effect film has a film surface parallel to the rear surfaces.

13. The magnetic reproducing head of claim 12, wherein the magnetoresistance effect film is disposed between the pair of magnetic yokes of ferromagnetic material and recessed from the medium-facing surface.

14. The magnetic reproducing head of claim 11, wherein the magnetic tip and rear portion comprise a continuously formed ferromagnetic material body.

15. The magnetic reproducing head of claim 11, wherein the magnetic tip is discrete from the rear portion.

16. The magnetic reproducing head of claim 11, further comprising a pair of electrodes, one of the pair of electrodes being coupled to a lower film surface of the magnetoresistance effect element and another one of the pair of electrodes being coupled to an upper film surface of the magnetoresistance effect element.

17. The magnetic reproducing head of claim 11, wherein the one of the pair of magnetic biasing films comprises the hard magnetic material layer and the hard magnetic material layer is disposed in contact with a side surface of the rear portion of the magnetic yoke.

18. The magnetic reproducing head of claim 17, wherein the side surface of the rear portion is tapered.

19. A magnetic reproducing apparatus for reproducing magnetic information recorded on a magnetic medium, comprising:
   a magnetic reproducing head having a magnetic gap at a medium-facing surface, comprising:
   a pair of magnetic yokes of ferromagnetic material, each of the pair of magnetic yokes having a magnetic tip at the medium-facing surface and a rear portion recessed from the medium-facing surface and magnetically coupled to the magnetic tip, at least one magnetic tip of the pair of magnetic yokes having a first width in a track width direction at the medium-facing surface, at least one rear portion of the pair of magnetic yokes having a second width in the track width direction, and the second width being wider than the first width, a magnetoresistance effect film recessed from the medium-facing surface, disposed between the pair of magnetic yokes and magnetically coupled to the pair of magnetic yokes of ferromagnetic material, the rear portion of one of the pair of magnetic yokes and the magnetoresistance effect film being aligned in a track length direction, a pair of biasing films recessed from the medium-facing surface, one of the pair of biasing films comprising a hard magnetic material layer disposed adjacent to the rear portion or an antiferromagnetic material layer disposed in contact with the rear portion, the rear portion of the one of the pair of magnetic yokes and the pair of biasing films being aligned in the track width direction;

an insulation layer disposed between each of the pair of magnetic yokes and the magnetoresistance effect film and also between each of the pair of biasing films and the magnetoresistance effect film.

* * * * *